US006910188B2

(12) United States Patent
Keohane et al.

(10) Patent No.: US 6,910,188 B2
(45) Date of Patent: Jun. 21, 2005

(54) VIEWING CHANGES TO A SHARED DOCUMENT IN ONE OBJECT

(75) Inventors: Susann M. Keohane, Austin, TX (US); Johnny M. H. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 09/892,966

(22) Filed: Jun. 27, 2001

(65) Prior Publication Data
US 2003/0001891 A1 Jan. 2, 2003

(51) Int. Cl.$^7$ .............................. G09F 3/00; G09F 9/00; G09F 17/00
(52) U.S. Cl. ....................... 715/751; 715/741; 715/511; 715/753
(58) Field of Search ................................. 345/753, 741, 345/826, 805, 804, 854, 855, 840; 715/511

(56) References Cited

U.S. PATENT DOCUMENTS

| 5,511,187 | A |   | 4/1996 | Cragun ........................ 395/600 |
| 5,692,141 | A |   | 11/1997 | Kamisango et al. ........ 395/329 |
| 5,754,782 | A |   | 5/1998 | Masada ................. 395/200.43 |
| 5,796,396 | A | * | 8/1998 | Rich ........................... 345/741 |
| 5,806,078 | A | * | 9/1998 | Hug et al. .................. 715/511 |
| 5,946,464 | A |   | 8/1999 | Kito et al. ............. 395/200.32 |
| 6,058,416 | A |   | 5/2000 | Mukherjee et al. ......... 709/203 |
| 6,182,273 | B1 |  | 1/2001 | Tarumi .......................... 717/1 |
| 6,195,685 | B1 |  | 2/2001 | Mukherjee et al. ......... 709/205 |
| 6,654,032 | B1 | * | 11/2003 | Zhu et al. .................... 345/753 |

OTHER PUBLICATIONS

Camarda, Bill. Using Microsoft Word 97, 1997.*

* cited by examiner

Primary Examiner—Kristine Kincaid
Assistant Examiner—Boris Pesin
(74) Attorney, Agent, or Firm—Robert A. Voigt, Jr.; Winstead Sechrest & Minick P.C.; Diana R. Gerhardt

(57) ABSTRACT

A system, computer program product and method for viewing changes to a shared document in a single object. Upon executing a particular shared document to be opened by a particular user, the particular user may view at least a section of the original version of the document with one or more on-screen symbols, e.g., icons, in a single object. The one or more on-screen symbols may be associated with one or more users who made changes to the original version of the document. By selecting one of the one or more on-screen symbols, a menu may appear with one or more versions of the original document written by the user associated with the on-screen symbol. Upon selecting a particular version, at least a section of the original version of the document may appear with highlighted changes that indicate the changes made to the original version of the document in the selected version.

42 Claims, 7 Drawing Sheets

I BELIEVE THAT WE SHOULD SHIP 45 CRATES AT THE COST OF $850/UNIT. THE SHIPPING SHOULD BE DONE WITH OVERNIGHT TRANSPORT BECAUSE THE PARTS ARE CRITICAL TO THE MISSION.

THE TARGET DATE OF THE PROJECT IS THE FALL OF 2001. THERE IS A SLIPPAGE OF ONE OR TWO MONTHS IN THIS ESTIMATION.

SMITH   JONES   MILLER (Con't.)

(Con't.)

I BELIEVE THAT WE SHOULD SHIP 25 CRATES AT THE COST OF $1000/UNIT. THE SHIPPING SHOULD BE DONE WITH GROUND TRANSPORT BECAUSE THE PARTS ARE NOT CRITICAL TO THE MISSION.

THE TARGET DATE OF THE PROJECT IS THE FALL OF 2001. THERE IS A SLIPPAGE OF ONE OR TWO MONTHS IN THIS ESTIMATION.

SMITH　　JONES　　MILLER

Fig. 4

I BELIEVE THAT WE SHOULD SHIP 45 CRATES AT THE COST OF $850/UNIT. THE SHIPPING SHOULD BE DONE WITH OVERNIGHT TRANSPORT BECAUSE THE PARTS ARE CRITICAL TO THE MISSION.

THE TARGET DATE OF THE PROJECT IS THE FALL OF 2001. THERE IS A SLIPPAGE OF ONE OR TWO MONTHS IN THIS ESTIMATION.

SMITH   JONES   MILLER

Fig. 5

VIEWING CHANGES TO A SHARED DOCUMENT IN ONE OBJECT

TECHNICAL FIELD

The present invention relates to the field of groupware applications, and more particularly to a groupware application that allows changes to a shared document by each user to be viewed relative to the original version of the shared document within a single object.

BACKGROUND INFORMATION

In a network system, one or more clients may be coupled to a server where the server may store one or more applications shared by one or more users, i.e., the one or more users of the one or more clients. An application shared by one or more users may commonly be referred to as a groupware application. Subsequently, a groupware application may allow multiple users to be simultaneously active within the single groupware application. In this manner, several users may simultaneously utilize documents in the groupware application. Typically, a document may be passed along to users through groupware code, e.g., Lotus™. When the document is edited by one of the users who have access to the document, it may be saved by that particular user under the current version. When that particular user saves the edited document under the current version, the previous changes made by other user(s) may be lost. Subsequently, that particular user may save the edited document under a new version thereby preserving the previous changes made by other user(s) in a previous version.

When a user desires to compare the differences in one version versus another version of a particular document, the user may use an application, e.g., Compare Rite, that highlights the changes made between the two versions. A new document may subsequently be created by the application, e.g., Compare Rite, indicating which words were added and deleted in one of the two versions with respect to the other version of the document. Unfortunately, a version of the document embodying changes made by one or more users may not be viewed concurrently with the original version of the document in a single object thereby allowing a user to visually compare and contrast the changes made by one or more users. That is, a version of the document embodying changes made by one or more users may not be viewed concurrently with the original version of the document in the same window such as on a computer screen.

It would therefore be desirable to develop a groupware application that allows changes to a shared document by each user to be viewed relative to the original version of the shared document within a single object.

SUMMARY

The problems outlined above may at least in part be solved in some embodiments by providing one or more on-screen symbols, e.g., icons, in conjunction with the original version of the shared document in a single object. The one or more on-screen symbols may be associated with one or more users who made changes to the original document. By selecting one of the one or more on-screen symbols, a menu may appear with one or more versions of the original document written by the user associated with the on-screen symbol. Upon selecting a particular version, at least a section of the original document may appear with highlighted changes that indicate the changes made to the original document in the selected version.

In one embodiment of the present invention, a method for viewing changes to a shared document in a single object may comprise the step of opening a shared document by a first particular user. Upon opening the shared document, the original document with one or more on-screen symbols, e.g., icons, may be displayed on the display of the first particular user. The one or more on-screen symbols may indicate one or more users who have saved changes to the original document. A determination may be made as to whether to view the changes made to the original document by the first particular user or a second particular user. If the first particular user wants to view the changes made to the original document by either the first particular user or the second particular user then the first particular user selects the on-screen symbol associated with that particular user. Upon selecting the on-screen symbol, a menu may appear with one or more versions of the original document written by the user associated with the on-screen symbol. Upon selecting a particular version, at least a section of the original document may appear with highlighted changes that indicate the changes made to the original document in the selected version. In one embodiment, the section of the original document that appears may be the section indicating the first of the changes to the original document. A button may appear providing the first particular user an option to proceed to the next one or more changes in the original document. In one embodiment, at least one section of the original document may be displayed in parallel with the corresponding section in the version selected where the original document includes highlighted changes. In another embodiment, at least one section of the original document may be displayed with word(s) highlighted where the word (s) highlighted indicate the words in the original document that were changed in the selected version. The first particular user may select the highlighted word(s) to view the changes made to the highlighted word(s) in the selected version.

The first particular user may then decide to edit the selected version. In one embodiment, the first particular user may view the selected version by re-selecting the on-screen symbol associated with the selected version. Upon editing the selected version, the first particular user may attempt to save the changes made to the selected version. A determination may then be made as to whether the first particular user has an on-screen symbol associated with the original document. If the first particular user does not have an on-screen symbol associated with the original document then an onscreen symbol is created. When an on-screen symbol is created, an additional onscreen symbol associated with another particular user may be added to the list of one or more on-screen symbols appearing on the display. Once the determination step of determining whether the first particular user has an on-screen symbol associated with the original document is completed, the changes made in the version selected that result in changes made with respect to the original document may be saved in a file. That is, only the changes made with respect to the original document may be saved in a file even though the changes are made in a particular version that includes changes made to the original document.

If the first particular user decided not to view the changes made to the original document, then the first particular user may decide to edit the original document. Upon editing the original document, the first particular user may attempt to save the changes made to the original document. A determination may then be made as to whether the first particular user does has an on-screen symbol associated with the original document. If the first particular user does not have an on-screen symbol associated with the original document then an on-screen symbol is created. When an on-screen symbol is created, an additional on-screen symbol associated with another particular user may be added to the list of one or more on-screen symbols appearing on the display. Once the determination step of determining whether the first particular user has an on-screen symbol associated with the original document is completed, the changes made in the original document may be saved in a file.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 4 illustrates an object with at least a section of the original document along with one or more icons indicating one or more users who have saved changes to the original document in accordance with the present invention; and FIG. 5 illustrates changes made by a particular user with respect to an original version of the shared document in accordance with the present invention.

DETAILED DESCRIPTION

The present invention comprises a system, computer program product and method for viewing changes to a shared document in a single object. While the following discusses the present invention in conjunction with an application, the present invention may be implemented in a word processing tool, built-in editor or any tool that allows the user to create an on-screen symbol thereby allowing the user to view the original document with changes made to the original document within a single object. Furthermore, while the following discusses the present invention in conjunction with viewing textual changes, the present invention may be expanded to include viewing graphical changes.

Figure 1:
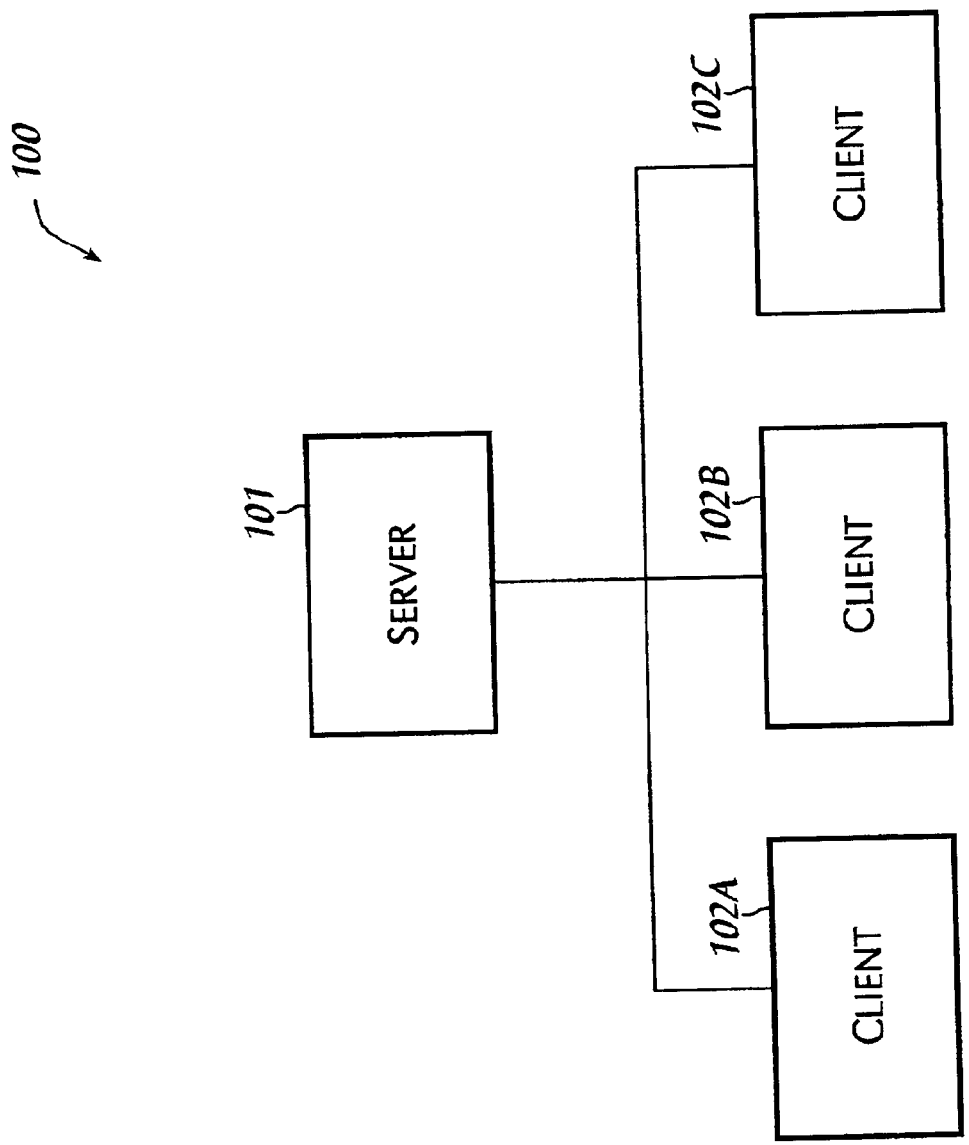
FIG. 1 illustrates an embodiment of a network system configured in accordance with the present invention.

FIG. 1—Network System

FIG. 1 illustrates one embodiment of the present invention of a network system 100. Network system 100 may comprise one or more clients 102A–C coupled to a server 101. Clients 102A–C may be configured to send requests to server 101 and server 101 may be configured to supply information to the one or more clients 102A–C. Clients 102A–C may collectively or individually be referred to as clients 102 or client 102, respectively. It is noted that network system 100 may comprise any number of clients 102 as well as any number of servers 101 and that FIG. 1 is illustrative. It is further noted that the connection between clients 102 and server 101 may be any medium type, e.g., wireless, wired. It is further noted that client 102 may be any type of device, e.g., wireless, Personal Digital Assistant (PDA), cell phone, personal computer system, workstation, Internet appliance, configured with the capability of connecting to the Internet and consequently communicating with server 101. It is further noted that network system 100 may be any type of system that has at least one server and at least one client and that FIG. 1 is not to be limited in scope to any one particular embodiment.

FIG. 2—Client

Figure 2:
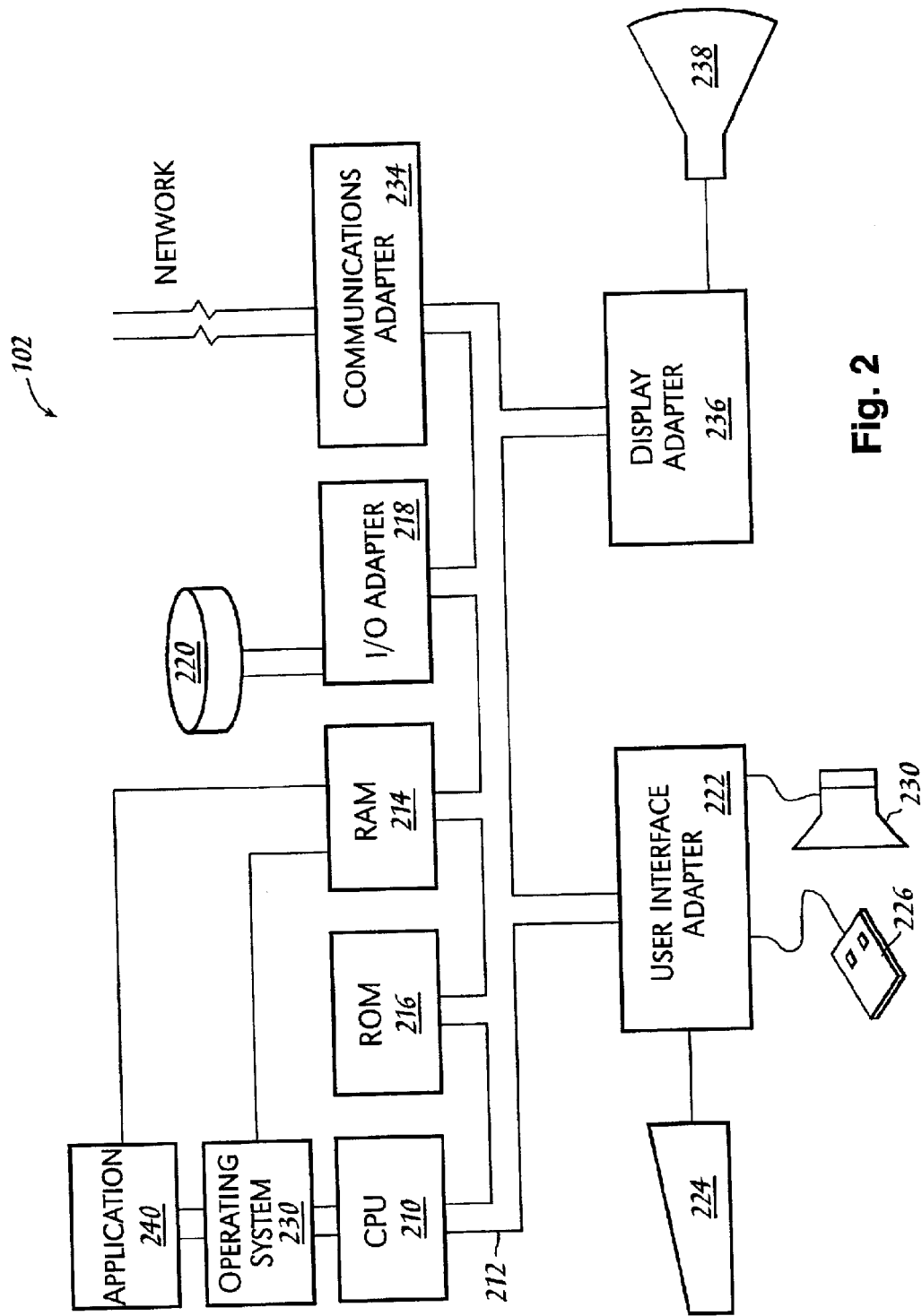
FIG. 2 illustrates an embodiment of a client in a network system configured in accordance with the present invention.

FIG. 2 illustrates a typical hardware configuration of client 102 which is representative of a hardware environment for practicing the present invention. Client 102 has a central processing unit (CPU) 210 coupled to various other components by system bus 212. An operating system 230 runs on CPU 110 and provides control and coordinates the function of the various components of FIG. 2. An application 240, e.g., program for allowing changes to a shared document by each user to be viewed relative to the original version of the shared document within a single object, as described in FIG. 3, runs in conjunction with operating system 230 and provides output calls to operating system 230 which implements the various functions or services to be performed by application 240. Read only memory (ROM) 216 is coupled to system bus 212 and includes a basic input/output system ("BIOS") that controls certain basic functions of client 102. Random access memory (RAM) 214, I/O adapter 218, and communications adapter 234 are also coupled to system bus 212. It should be noted that software components including operating system 230 and application 240 are loaded into RAM 214 which is the computer system's main memory. I/O adapter 218 may be an integrated drive electronics ("IDE") adapter that communicates with disk unit 220, e.g., disk drive. It is noted that the program of the present invention that allows changes to a shared document by each user to be viewed relative to the original version of the shared document within a single object, as described in FIG. 3, may reside in disk unit 220 or in application 240.

Communications adapter 234 interconnects bus 212 with an outside network enabling client 102 to communicate with other such systems via a Local Area Network (LAN), e.g., Ethernet, Token Ring, ARCnet, or a Wide Area Network (WAN), e.g., Internet. Input/Output devices are also connected to system bus 212 via a user interface adapter 222 and display adapter 236. Keyboard 224, mouse 226 and speaker 230 are all interconnected to bus 212 through user interface adapter 222. Event data may be input to client 102 through any of these devices. A display monitor 238 is connected to system bus 212 by display adapter 236. In this manner, a user is capable of inputting to client 102 through keyboard 224 or mouse 226 and receiving output from client 102 via display 238 or speaker 230.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change.

Figure 3:
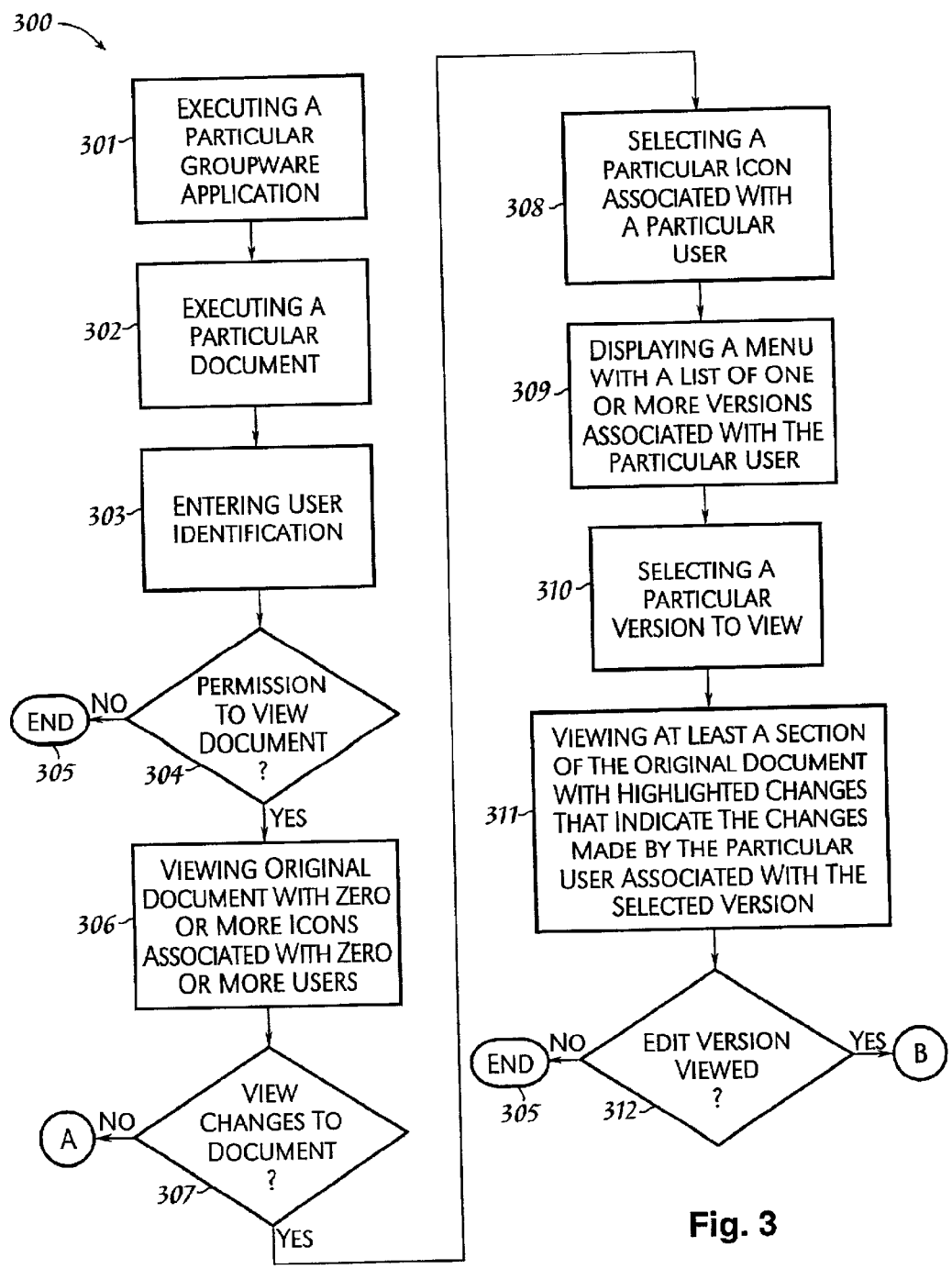
FIG. 3 is a flowchart of a method for allowing changes to a shared document by each user to be viewed relative to the original version of the shared document within a single object.
Figure 3:
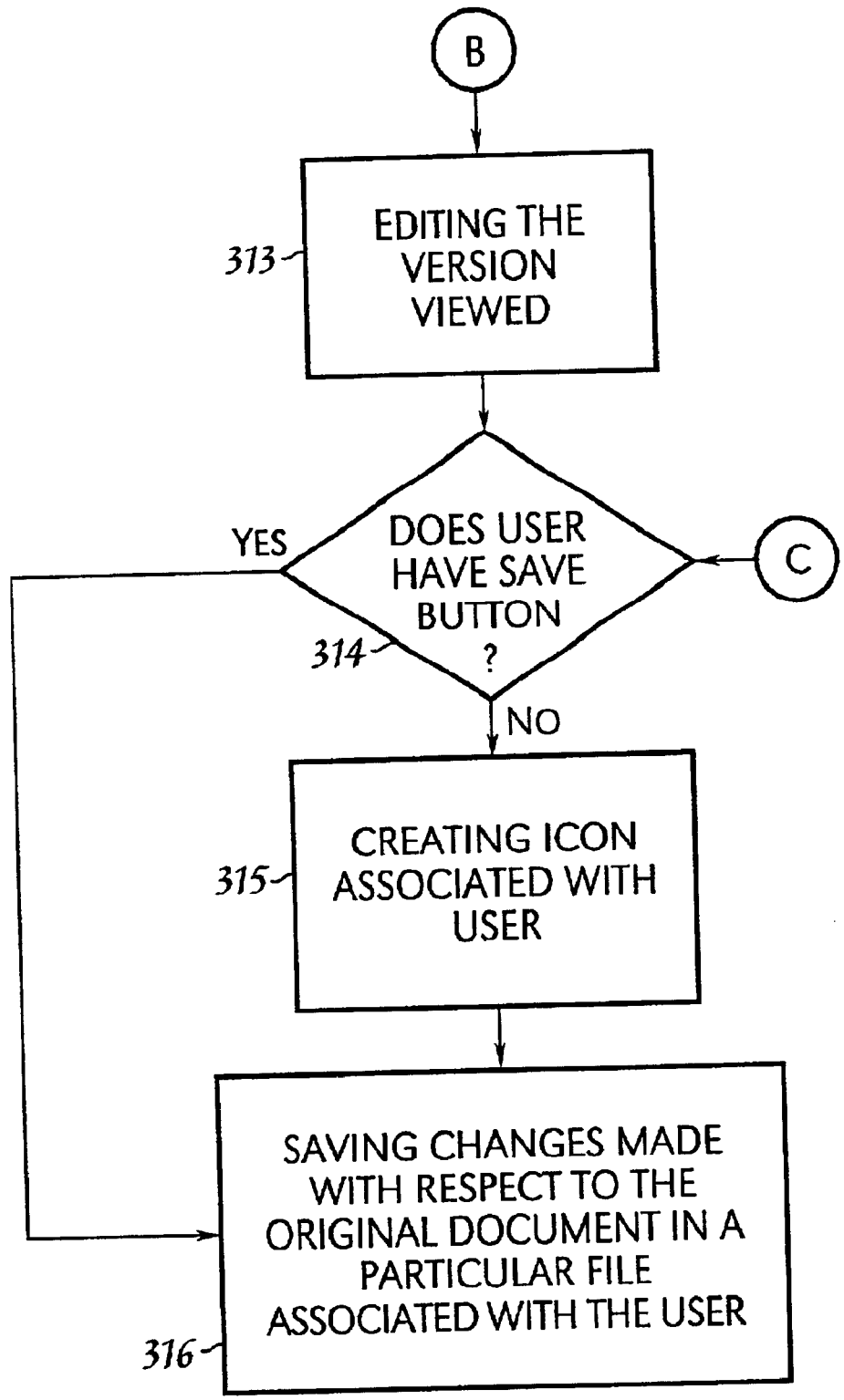
Figure 3:
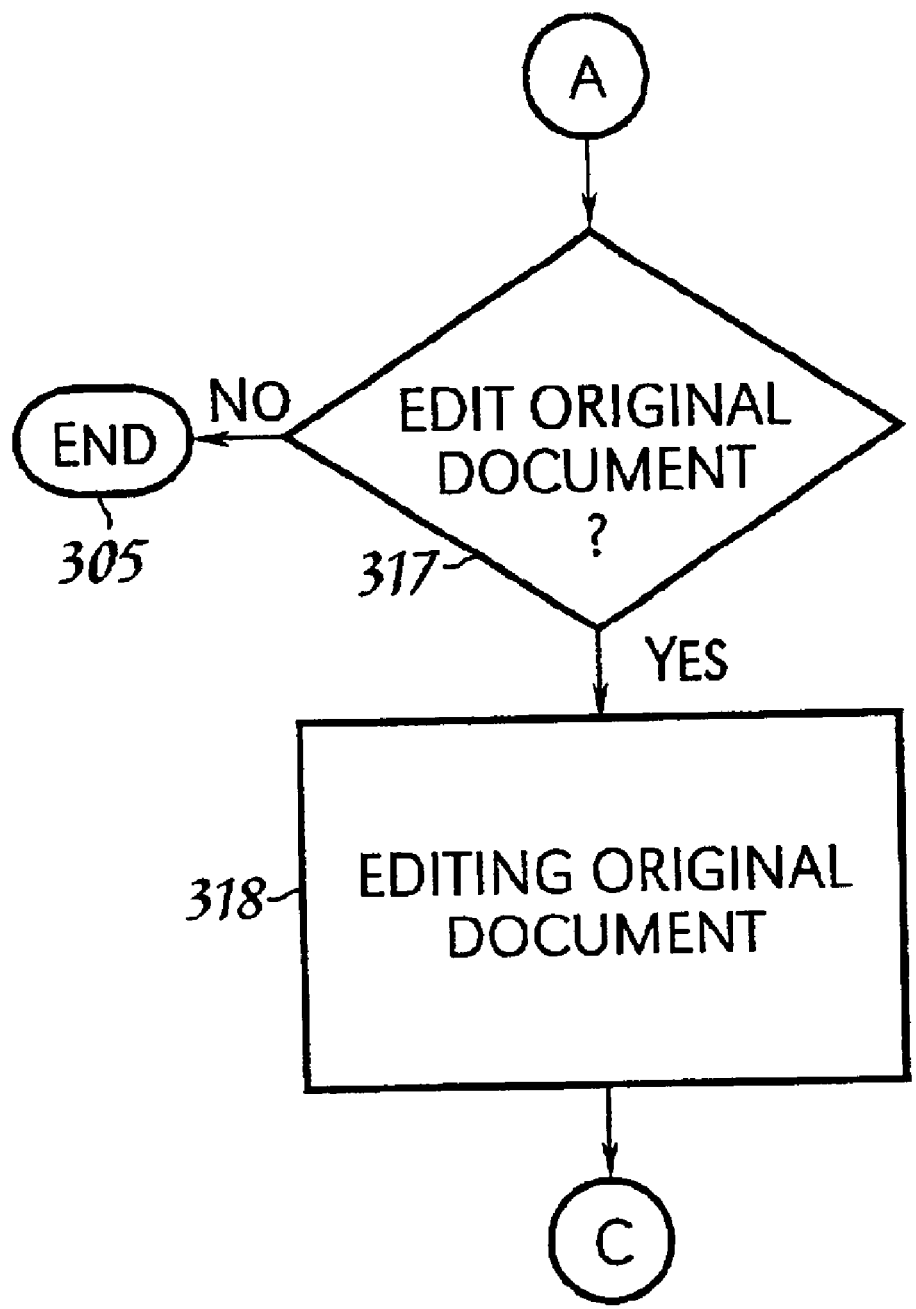

FIG. 3—Flowchart of a Method for Allowing Changes to a Shared Document by Each User to be Viewed Relative to the Original Version of the Shared Document Within a Single Object FIG. 3 is a flowchart of one embodiment of the present invention of a method 300 for allowing changes to a shared document by each user to be viewed relative to the original version of the shared document within a single object. As stated in the Background Information section, a version of the document embodying changes made by one or more users may not be viewed concurrently with the original version of the document in a single object thereby allowing a user to visually compare and contrast the changes made by one or more users. That is, a version of the document embodying changes made by one or more users may not be viewed concurrently with the original version of the document in the same window such as on a computer screen. It would therefore be desirable to develop a groupware application that allows changes to a shared document by each user to be viewed relative to the original version of the shared document within a single object. Method 300 is a method for allowing changes to a shared document by each user to be viewed relative to the original version of the shared document within a single object.

In step 301, a particular user of one of the one or more clients 102 coupled to server 101 may execute a particular groupware application, i.e., an application shared among the one or more clients 102, stored on server 101. In step 302, a particular document in the particular groupware application may be executed to be opened by the particular user. In step 303, the particular user may enter a user identification, e.g., user ID, password, in response to a prompt issued by the groupware application. In step 304, a determination may be made as to whether the particular user identified in step 303 has permission to view the document executed to be opened in step 302. If the particular user identified in step 303 does not have permission to view the document executed to be opened in step 302 then method 300 is terminated in step 305.

If the particular user identified in step 303 has permission to view the document executed to be opened in step 302, then the particular user may view the document in step 306. When the particular user views the document, the particular user may view on display 238 at least a section of the original document with one or more on-screen symbols, e.g., icons, indicating one or more users who have saved changes to the original document as illustrated in FIG. 4. FIG. 4 is an illustration of an object with at least a section of the original document along with one or more on-screen symbols, e.g., icons, indicating one or more users who have saved changes to the original document in accordance with the present invention. Each on-screen symbol may be representative of one or more versions of the original document generated by the particular user associated with the on-screen symbol as described further below.

A determination may then be made as to whether to view the changes made to the original document by a particular user, including the user identified in step 303, in step 307. If the user identified in step 303 wants to view changes made to the original document by a particular user, including the user identified in step 303, then the user selects the on-screen symbol associated with that particular user in step 308. For example, referring to FIG. 4, if the user identified in step 303 wants to view changes made to the original document by Smith then the user selects the on-screen symbol, e.g., icon, entitled "Smith." In one embodiment, when the on-screen symbol is selected a pop-up menu may be displayed on display 238 in step 309. The pop-up menu may display one or more versions of the original document written by the user associated with the on-screen symbol selected in step 308. In step 310, the user may select a particular version of the original document where the version comprises information regarding the changes made with respect to the original document. Upon selection of a particular version, the user, in step 311, may view on display 238 at least a section of the original document with highlighted changes that indicate the changes made by the particular user associated with the on-screen symbol, e.g., icon, as illustrated in FIG. 5. FIG. 5 illustrates the changes made by a particular user with respect to an original document in accordance with the present invention. As further illustrated in FIG. 5, the on-screen symbol, e.g., icon, associated with the particular user whose changes are highlighted on display 238 may change form. This is illustrated in FIG. 5 by the dotted shading and the corresponding bold face font. It is noted that the changes made to the original document may be illustrated in other forms not exemplified in FIG. 5 and that FIG. 5 is illustrative. It is further noted that in one embodiment, the section of the original document with highlighted changes displayed on display 238 may be the section indicating the first of the changes of the original document. The user as identified in step 303 may be provided with an option to proceed to the next one or more changes in the original document. For example, a button may appear on display 238 providing the user as identified in step 303 with an option to proceed to the next one or more changes in the original document. It is further noted that in one embodiment, the original document may be displayed while overlying the original document with changes made with respect to the original document as stored in a file associated with the selected version. Each version may have a file associated with it storing the words changed with respect to the original document including instructions as to where the words are to be placed in the original document. In one embodiment, the file associated with the selected version may be appended to the file storing the original document. In one embodiment, at least one section of the original document may be displayed on display 238 in parallel with the corresponding section in the version selected where the original document includes highlighted changes. In another embodiment, at least one section of the original document may be displayed with word(s) highlighted where the word(s) highlighted indicate the words in the original document that were changed in the selected version. The user may then select the highlighted word(s) to view the changes made to the highlighted word(s) in the selected version.

In step 312 a determination may be made as to whether the version selected is to be edited by the user identified in step 303. If the user identified in step 303 is not to edit the version selected then method 300 is terminated in step 305. If the user identified in step 303 is to edit the version selected then the user identified in step 303 edits the version selected in step 313. In one embodiment, the user identified in step 303 may view the selected version by re-selecting the on-screen symbol associated with the selected version. Upon viewing the selected version, the user identified in step 303 may edit the selected version in step 313. Upon the user identified in step 303 attempting to save the changes made to the version selected, a determination may be made in step 314 as to whether the user identified in step 303 has a save button, i.e., an on-screen symbol associated with the user identified in step 303. If the user identified in step 303 does not have an on-screen symbol indicating changes made to the original document then an on-screen symbol associated with the user identified in step 303 is created in step 315. When an on-screen symbol is created, an additional on-screen symbol associated with another particular user may be added to the list of one or more on-screen symbols, e.g., icons, on display 238. Once the step of determining whether the first particular user has an on-screen symbol associated with the original document is completed, the changes made in the version selected that resulted in changes made with respect to the original document may be saved in a file in step 316. That is, only the changes made with respect to the original document may be saved in a file even though the changes are made in a particular version that includes changes made to the original document. The file may include instructions as to where the changed words are located in the original document. By saving only the changes made with respect to the original document, changes made to the original document by one or more users may be viewed in a single object.

Referring to step 307, if the user identified in step 303 does not want to view the changes made to the original document by a particular user, including the user identified in step 303, then a determination may be made in step 317 as to whether the original document viewed is to be edited by the user identified in step 303. If the user identified in step 303 is not to edit the original document viewed then method 300 is terminated in step 305. If the user identified in step 303 is to edit the original document viewed then the user identified in step 303 edits the original document viewed in step 318. Upon the user identified in step 303 attempting to save the changes made to the original document viewed, a determination may be made in step 314 as to whether the user identified in step 303 has a save button, i.e., an on-screen symbol associated with the user identified in step 303. If the user identified in step 303 does not have an on-screen symbol indicating changes made to the original document then an on-screen symbol associated with the user identified in step 303 is created in step 315. Once the step of determining whether the first particular user has an on-screen symbol associated with the original document is completed, the changes made to the original document may be saved in a file in step 316. By saving only the changes made with respect to the original document, changes made to the original document by one or more users may be viewed in a single object.

It is noted that method 300 may be executed in a different order presented and that the order presented in the discussion of FIG. 3 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for viewing changes to a shared document in a single object comprising the steps of:
   opening said shared document by a first user;
   viewing an original version of said shared document with one or more on-screen icons indicating one or more users who have saved changes to said original version of said shared document;
   selecting an on-screen icon associated with one of said first and a second user; and
   viewing at least a section of said original version of said shared document with highlighted changes in said single object, wherein said highlighted changes indicate changes made by one of said first and said second user associated with said selected on-screen icon with respect to said original version of said shared document.

2. A computer program product embodied in a machine readable medium for viewing changes to a shared document in a single object comprising the programming steps of:
   opening said shared document by a first user;
   viewing an original version of said shared document with one or more on-screen icons indicating one or more users who have saved changes to said original version of said shared document;
   selecting an on-screen icon associated with one of said first and a second user; and
   viewing at least a section of said original version of said shared document with highlighted changes in said single object, wherein said highlighted changes indicate changes made by one of said first and said second user associated with said selected on-screen icon with respect to said original version of said shared document.

3. A system, comprising:
   a memory unit operable for storing a computer program for viewing changes to a shared document in a single object; and
   a processor coupled to said memory unit, wherein said processor, responsive to said computer program, comprises:
     circuitry for opening said shared document by a first user;
     circuitry for viewing an original version of said shared document with one or more on-screen icons indicating one or more users who have saved changes to said original version of said shared document;
     circuitry for selecting an on-screen icon associated with one of said first and a second user; and
     circuitry for viewing at least a section of said original version of said shared document with highlighted changes in said single object, wherein said highlighted changes indicate changes made by one of said first and said second user associated with said selected on-screen icon with respect to said original version of said shared document.

4. The method as recited in claim 1 further comprising the steps of:
   entering a user identification associated with said first user; and
   determining whether said first user has permission to open said shared document based on said user identification associated with said first user.

5. The method as recited in claim 1, where upon selecting said on-screen icon associated with one of said first and said second user a menu is displayed with a list of one or more versions of said shared document authored by said first or said second user.

6. The method as recited in claim 5 further comprising the step of:
   selecting one of said one or more versions of said shared document.

7. The method as recited in claim 1 further comprising the step of:

editing said original version of said shared document.

8. The method as recited in claim 7 further comprising the step of:

determining whether said first user has an on-screen icon associated with said first user indicating that said first user has edited said shared document.

9. The method as recited in claim 8 wherein if there is no on-screen icon associated with said first user then the method further comprises the step of:

creating an on-screen icon associated with said first user.

10. The method as recited in claim 9 further comprising the step of:

saving changes made to said original version of said shared document in a file associated with said first user.

11. The method as recited in claim 7 further comprising the step of:

saving changes made to said original version of said shared document in a file associated with said first user.

12. The method as recited in claim 6 comprising the step of:

editing said selected version of said shared document.

13. The method as recited in claim 12 further comprising the step of:

determining whether said first user has an on-screen icon associated with said first user indicating that said first user has edited said shared document.

14. The method as recited in claim 13 wherein if there is no on-screen icon associated with said first user then the method further comprises the step of:

creating an on-screen icon association with said first user.

15. The method as recited in claim 14 further comprising the step of:

saving changes made to said original version of said shared document based on changes made to said selected version in a file associated with said first user.

16. The method as recited in claim 12 further comprising the step of:

saving changes made to said original version of said shared document based on changes made to said selected version in a file associated with said first user.

17. The computer program product as recited in claim 2 further comprising the programming steps of:

entering a user identification associated with said first user; and determining whether said first user has permission to open said shared document based on said user identification associated with said first user.

18. The computer program product as recited in claim 2, wherein upon selecting said on-screen icon associated with one of said first and said second user a menu is displayed with a list of one or more versions of said shared document author by said first or said second user.

19. The computer program product as recited in claim 18 further comprising the programming step of:

selecting one of said one or more versions of said shared document.

20. The computer program product as recited in claim 2 further comprising the programming step of:

editing said original version of said shared document.

21. The computer program product as recited in claim 20 further comprising the programming step of:

determining whether said first user has an on-screen icon associated with said first user indicating that said first user has edited said shared document.

22. The computer program product as recited in claim 21, if there is no on-screen icon associated with said first user then the computer program product further comprises the programming step of:

creating an on-screen icon associated with said first user.

23. The computer program product as recited in claim 22 further comprising the programming step of:

saving changes made to said original version of said shared document in a file associated with said first user.

24. The computer program product as recited in claim 20 further comprising the programming step of:

saving changes made to said original version of said shared document in a file associated with said first user.

25. The computer program product as recited in claim 19 further comprising the programming step of:

editing said selected version of said shared document.

26. The computer program product as recited in claim 25 further comprising the programming step of:

determining whether said first user has an on-screen icon associated with said first user indicating that said first user has edited said shared document.

27. The computer program product as recited in claim 26, wherein if there is no on-screen icon associated with said first user then the computer program product further comprises the programming step of:

creating an on-screen icon association with said first user.

28. The computer program product as recited in claim 27 further comprising the programming step of:

saving changes made to said original version of said shared document based on changes made to said selected version in a file associated with said first user.

29. The computer program product as recited in claim 25 further comprising the programming step of:

saving changes made to said original version of said shared document based on changes made to said selected version in a file associated with said first user.

30. The system as recited in claim 3, wherein said processor further comprises:

circuitry for entering a user identification associated with said first user; and circuitry for determining whether said first user has permission to open said shared document based on said user identification associated with said first user.

31. The system as recited in claim 3, wherein said processor further screen icon associated with one of said first and said second user a menu is displayed with a list of one or more versions of said shared document authored by said first or said second user.

32. The system as recited in claim 31, wherein said processor further comprises:

circuitry for selecting one of said one or more versions of said shared document.

33. The system as recited in claim 3, wherein said processor further comprises:

circuitry for editing said original version of said shared document.

34. The system as recited in claim 33, said processor further comprises:

circuitry for determining whether said first user has an on-screen icon associated with said first user indicating that said first user has edited said shared document.

35. The system as recited in claim 34, wherein if there is no on-screen icon associated with said first user then said processor further comprises:

circuitry for creating an on-screen icon associated with said first user.

36. The system as recited in claim 35, wherein said processor further comprises:
  circuitry for saving changes made to said original version of said shared document in a file associated with said first user.

37. The system as recited in claim 33, wherein said processor further comprises:
  circuitry for saving changes made to said original version of said shared document in a file associated with said first user.

38. The system as recited in claim 32, wherein said processor further comprises:
  circuitry for editing said selected version of said shared document.

39. The system as recited in claim 38, wherein said processor further comprises:
  circuitry for determining whether said first user has an on-screen icon associated with said first user indicating that said first user has edited said shared document.

40. The system as recited in claim 39, wherein if there is no on-screen icon associated with said first user then said processor further comprises:
  circuitry for creating an on-screen icon association with said first user.

41. The system as recited in claim 40, wherein said processor further comprises:
  circuitry for saving changes made to said original version of said shared document based on changes made to said selected version in a file associated with said first user.

42. The system as recited in claim 38, wherein said processor further comprises:
  circuitry for saving changes made to said original version of said shared document based on changes made to said selected version in a file associated with said first user.

* * * * *

UNITED STATES PATENT AND TRADEMARK OFFICE
CERTIFICATE OF CORRECTION

PATENT NO.    : 6,910,188 B2                                        Page 1 of 1
DATED         : June 21, 2005
INVENTOR(S)   : Keohane et al.

It is certified that error appears in the above-identified patent and that said Letters Patent is hereby corrected as shown below:

Column 9,
Line 55, prior to "by said first or said second user" please correct the spelling of "author" to -- authored --.

Column 10,
Line 2, prior to "if there is no on-screen icon ..." please insert the word -- wherein --.
Lines 47-48, replace "said processor further screen" with -- upon selecting said on-screen --.

Signed and Sealed this

Eighth Day of November, 2005

JON W. DUDAS
*Director of the United States Patent and Trademark Office*